United States Patent Office 2,858,166
Patented Oct. 28, 1958

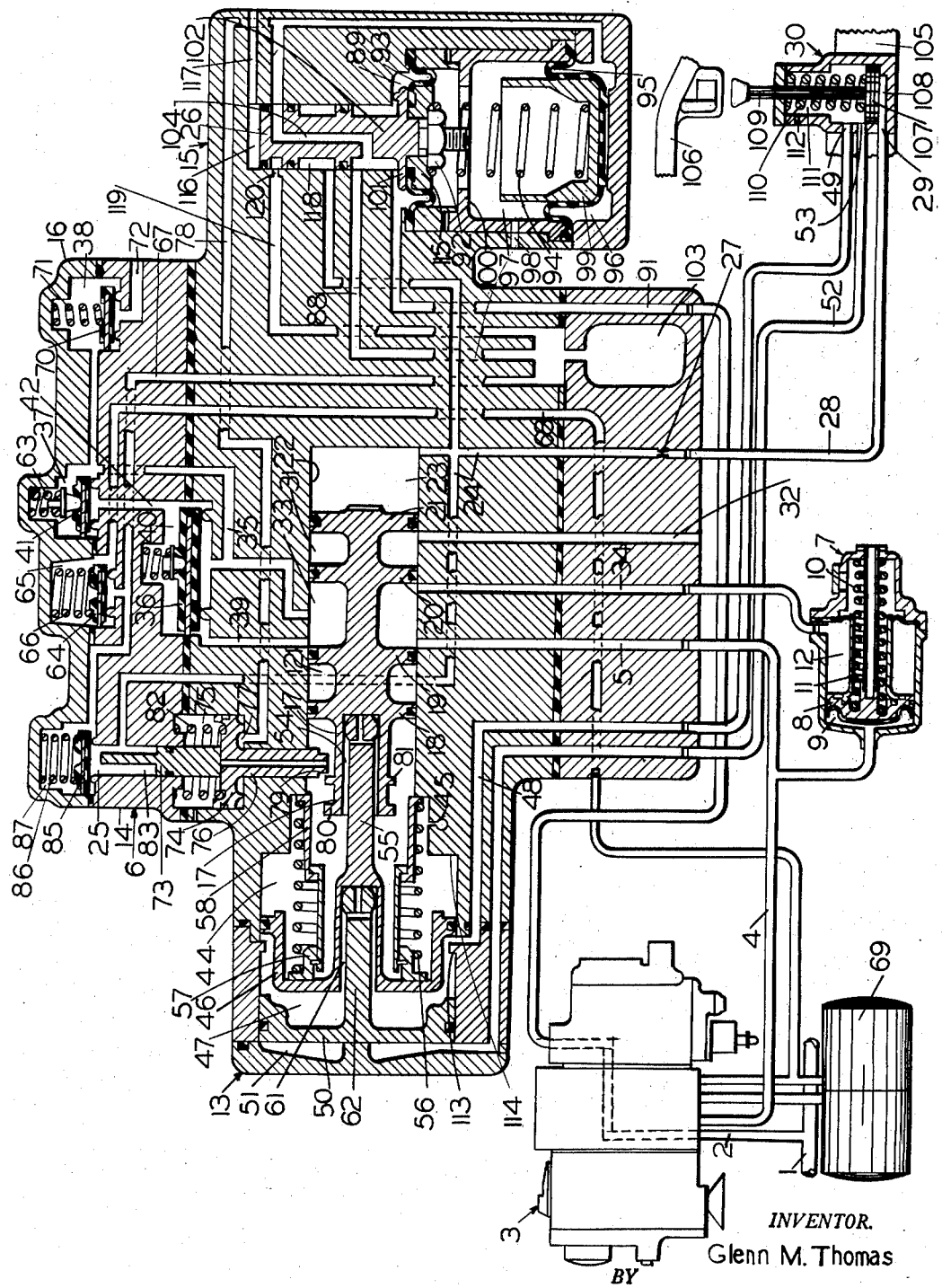

2,858,166

FLUID PRESSURE BRAKE APPARATUS

Glenn M. Thomas, Irwin, Pa., assignor to Westinghouse Air Brake Company, Wilmerding, Pa., a corporation of Pennsylvania Application June 16, 1954, Serial No. 437,068

4 Claims. (Cl. 303—22)

This invention relates to fluid pressure brake apparatus for railway vehicles and in particular to the type for braking a vehicle in accordance with the degree of load carried by the vehicle.

In a copending application, Serial No. 238,918, filed July 27, 1951 and on which U. S. Patent 2,721,768 was granted on October 25, 1955, to Earle S. Cook, there is disclosed a brake apparatus having service and emergency portions operative upon service and emergency reductions in brake pipe pressure to supply fluid under pressure to effect service and emergency applications, respectively, of brakes on a vehicle. The brake apparatus also includes a load compensating valve portion which is automatically adjustable in accordance with the load on the vehicle to correspondingly limit the degree of brake application effected by such fluid under pressure.

The load compensating portion disclosed in the above-mentioned application provides for a relatively large number of adjustments corresponding to a relatively large number of different degrees of load. It is believed, however, that three adjustments correspondent to an empty vehicle, a fully loaded vehicle and a partially loaded vehicle, such as one-half load, are adequate for freight service and the principal object of the invention, therefore, is the provision of a relatively simple and inexpensive three adjustment device for use in a brake apparatus such as above described.

Another object is to provide a separate load compensating portion of the aforesaid three adjustment type for cooperation with such as the conventional AB fluid pressure brake equipment, shown and described in Patent No. 2,031,213, issued to C. C. Farmer on February 18, 1936, for controlling pressure of fluid in the compensating chamber of a brake cylinder device of the type having the usual main pressure chamber and an opposing compensating chamber for limiting the effectiveness of said main pressure chamber to apply the brakes according to the degree of load on the vehicle.

Other objects and advantages will become apparent from the following more detailed description of the invention.

In the accompanying drawing, the single figure is a diagrammatic view of a fluid pressure brake apparatus embodying this invention.

Description

As shown in the drawing, reference numeral 1 designates the usual brake pipe which is connected to a branch pipe 2 leading to a brake controlling valve device 3 which may comprise service and emergency application valve devices, such as those disclosed in the second above-mentioned patent, adapted to operate in the usual manner upon service and emergency reductions in brake pipe pressure to supply fluid under pressure to a brake cylinder pipe 4. Fluid under pressure thus supplied to pipe 4 may flow to a passage 5 in a device 6, embodying the invention, and to a brake cylinder device 7 for actuating same to either a service or an emergency application of brakes according to the kind of reduction made in brake pipe pressure.

The brake cylinder device 7 may comprise a casing containing a piston 8, at one side of which is the usual pressure chamber 9 in which fluid under pressure from pipe 4 may become effective on said piston to move same in the direction of the right hand for applying the brakes. Upon release of fluid under pressure from chamber 9 by way of pipe 4, a return spring 10 is adapted to move piston 8 toward the left hand to a brake release position which is shown in the drawing. A cylinder 11 encircling return spring 10 and attached at one end to the piston 8 and slidably mounted adjacent its opposite end in the casing cooperates with said piston and casing to define a load compensating chamber 12 about said cylinder for receiving fluid under pressure to oppose the pressure of fluid in chamber 9 acting on piston 8. With a fully loaded vehicle chamber 12 will be open to atmosphere, as will be described later, in order that the brakes on the vehicle will be applied to a degree governed by the full pressure of fluid in chamber 9 acting on piston 8. With a vehicle empty a certain maximum pressure of fluid will be provided in chamber 12 whereby the degree of braking of the empty vehicle will be limited to the differential in opposing forces acting on piston 8. For a partially or half-loaded vehicle, for example, a certain lower pressure of fluid will be provided in chamber 12 in order to obtain a greater differential in opposing forces acting on piston 8 as necessary to provide the greater braking force for the half-loaded vehicle than for the empty vehicle.

The device 6 comprises a casing containing a load adjustable control device 13, a locking device 14 for locking said control device in an adjusted position, a cut-off device 15 for controlling operation of devices 13 and 14, and a fluid pressure control device 16 for regulating pressure of fluid in the brake cylinder compensating chamber 12 according to the adjustment of the control device 13 and hence according to the load on the vehicle.

The load adjustable control device 13 comprises a brake control rod 17 which constitutes a common stem for four pistons 18, 19, 20 and 21 disposed in spaced relation to each other in a common bore 22 formed in the casing. A chamber 23 formed in bore 22 at the right-hand side of piston 21, as viewed in the drawing, is constantly open to a passage 24 which leads to a bore 25 in the locking device 14, to a seat for a slide valve 26 in the cut-off valve device 15, and through a choke 27 and a pipe 28 to a port 29 in a strut device 30.

It is desired that choke 27 be of such flow capacity as to restrict the flow of fluid under pressure to pipe 28 to such a degree that, in the event of a rupture of pipe 28, sufficient fluid pressure will be developed in chamber 89 by supply from brake pipe 1 to operate cut-off valve device 15 to its cut-off position, in a manner hereinafter described, despite the rupture of said pipe. As will become apparent later, the pressure of fluid in chamber 23 will always actuate the brake control rod 17 to its empty vehicle position before operation of device 15.

As shown in the drawing a chamber 31 is located between the pistons 20 and 21, which chamber may be connected to atmosphere by way of a passage 32. A chamber 33 is defined in bore 22 between the pistons 19 and 20, which chamber may be connected to chamber 12 in the brake cylinder device 7 by way of a passage 34 and to chamber 9 in said brake cylinder device by way of passage 5. As may be seen in the drawing, this chamber 33 may also be connected to a passage 35 leading to the seated area of a check valve 36 and to valve chambers 37 and 38. At the same time chamber 33 is connected by way of a passage 39 to a valve chamber 40 containing the check valve 36, which chamber is always open to the seated area of a check valve 41 contained in chamber 37 through a passage 42. A chamber 121 is defined between the pistons 18 and 19 while at the opposite side or outer side of piston 18 is formed a chamber 44 which is constantly open to atmosphere by way of a passage 45. Chamber 44 is closed at its outer end by a piston 46 slidably mounted in a suitable bore in a casing, which piston separates said chamber from a chamber 47 which is constantly connected through a passage and pipe 48 to a port 49 in the strut device 30. Chamber 47 in turn is defined at its outer end by a piston 50 slidably mounted in a suitable bore in the casing and separating said chamber from a chamber 51 which is constantly connected through a passage and pipe 52 to a port 53 in the strut cylinder device 30.

The control rod 17 is provided with a centrally located, axially extending cavity 54 for the reception of a stem 55 of the piston 46 for the purpose of actuating said control rod in response to pressure of fluid in chamber 47 against the pressure of a spring 56 contained in the chamber 44 and supported therein by a pair of telescoping seat members 57 and 58 and against the pressure of fluid in chamber 23. The piston 46 is likewise provided with a cavity 61 for the accommodation of a stem 62 of the piston 50 for the purpose of actuating piston 46 inwardly against the pressure of spring 56 in response to the pressure of fluid in chamber 51 and against the pressure of fluid in chamber 23.

The control valve device 16 includes the check valve 41 operably mounted in the chamber 37 which, as will appear more fully later, is urged to its seated position by a spring 63 contained in said chamber and serves to determine the degree by which the pressure in main pressure chamber 9 exceeds the pressure in the load compensating chamber 12 of the brake cylinder device 7 for the braking of the half-loaded vehicle.

The control valve device 16 further comprises a charging check valve 64 contained in a chamber 65 and urged towards its seating position by a spring 66 for controlling flow of fluid under pressure supplied from brake pipe 1 by way of the cut-off valve device 15 to passages 88, 67 and thence past valve 64 to passage 68 leading to an emergency reservoir 69.

The control valve device 16 also comprises an intake check valve 70 contained in the chamber 38 and biased towards its seating position by a spring 71 for permitting the flow of fluid under pressure from the atmosphere by way of passage 72, passage 35, chamber 33, and passage 34 to the load compensating chamber 12 in the brake cylinder device 7 for compensating for the movement of the piston 8 to its release position by the return spring 10.

The locking device 14 comprises a plunger 73 slidably mounted in a bore in the casing and abutting at one end a locking piston 74 operably mounted in a chamber 75 formed in the casing. The locking piston 74 is provided with a stem 76 contained in a chamber 77 which is open to a passage 78 leading to the seat of the slide valve 26 of the cut-off valve device 15, the stem 76 being slidably guided in an opening in the casing connecting with chamber 44 and provided at its inner end in said chamber with a dog 79 for locking relation with annular bosses 80 and 81 formed on control rod 17. A spring 82 contained in chamber 75 presses the piston 74 downwardly toward the position in which the dog 79 will be in locking relation with one or both of bosses 80 and 81 according to the loaded condition of the vehicle, as will appear more fully later. The opposite end of the plunger 73 defines in part a chamber 83 which is open by way of passage 24 to the seat for slide valve 26 in cut-off valve device 15. The chamber 83 at the end opposite to plunger 73 is closed by a check valve 85 which is urged toward its seated position by a spring 86 contained in a chamber 87 which chamber may be connected by way of passages 67 and 88 to a chamber 89 through the aforesaid seat of slide valve 26, as shown in the drawing. When fluid under pressure is supplied through passage 78, as will be described later, the pressure thereof acting in chamber 77 on piston 74 will actuate said piston upwardly against the pressure of spring 82, thereby moving the stem 76 out of locking relation with the bosses 80 and 81. Following the withdrawal of the dog 79 of the stem 76 away from said locking relation plunger 73 will unseat check valve 85 thereby establishing communication between passages 67 and 24 for purposes which will be more readily understood later.

The cut-off valve device 15 comprises a section of a casing providing the chamber 89 and which is in constant communication with a passage 91 leading to the brake controlling valve device 3 and supplied thereby with fluid under pressure from the brake pipe 1 by way of branch pipe 2. The slide valve 26 is connected by screw-thread means 92 and a follower plate 115 to a flexible diaphragm 93 for movement thereby in response to fluid pressure in chamber 89. The side of diaphragm 93 opposite to the chamber 89 is subjected to the pressure of a spring 94, one end of which operatively engages said diaphragm while the opposite end operatively engages one side of a coaxially arranged flexible diaphragm 95, at the opposite side of which is a pressure chamber 96 open by way of a branch of passage 78 to the seat of slide valve 26. A chamber 97 which is open to atmosphere by way of a passage 98 is located between diaphragms 93 and 95. An annular lip 100 is formed in the casing which extends inwardly into chamber 97 and serves as a stop to be contacted by follower plate 115, to limit the travel of diaphram 93 and, similarly, through the medium of a cup-shaped follower 99 that is interposed between spring 94 and diaphragm 95, limit the movement of diaphragm 95.

Whenever the pressure of fluid in brake pipe 1 is less than a chosen degree, such as ten pounds, spring 94 will deflect diaphragm 93 against such pressure in chamber 89 and thereby move slide valve 26 to a cut-in position in which it is shown in the drawing and which position may be defined by contact of a follower 101 with the casing. In this position of slide valve 26 passage 91, which is supplied with fluid under pressure from brake pipe 1 as previously described, will be connected by way of a reduced portion 102 of slide valve 26 to the passage 88 leading to a timing reservoir 103 and also to the passage 67 and by way of said reduced portion and a passage 104 in said slide valve to passage 78, and spring 94 will hold diaphragm 95 in the position in which it is shown in the drawing.

The strut device 30 is adapted to be carried by a sprung portion 105 of a vehicle under the unsprung portion 106, whereby it will be spaced away from said unsprung portion 106 a distance which varies according to the degree of load on the vehicle. The strut device 30 comprises a casing containing a vertically movable piston 107, at the lower side of which is a pressure chamber 108 open by way of port 29, passage and pipe 28, choke 27 and passage 24 to chamber 23 in the load adjustable control device 13. Projecting upwardly from the upper side of piston 107 is a rod 109 terminating exteriorly of the casing below the unsprung portion 106 of the vehicle. A spring 110 contained in a chamber 111 of the casing of the device 30 acts on piston 107 for urging it to the position in which it is shown in the drawing, said chamber being open to atmosphere through a vent port 112.

When the vehicle is empty, the struct device 30 will occupy a position relative to the unsprung portion 106 such as that shown in the drawing in which upward movement of piston 107 will be so limited by engagement with the unsprung portion 106 as not to connect chamber 108 with either ports 53 or 49. When the vehicle is substantially half-loaded, the strut device will occupy a lower position relative to the unsprung portion 106 to permit sufficient movement of piston 107 to connect pipe 52 through port 53 to chamber 108. When the vehicle is fully-loaded, such movement of piston 107 will be permitted as will open chamber 108 to pipe and passage 48 through port 49, and thereby to chamber 47 in the device 13.

*Initial charging*

In initially charging brake pipe 1, or upon charging said brake pipe following venting thereof to a pressure less than the exemplary ten p. s. i., fluid under pressure will be supplied from said brake pipe by the brake controlling valve device 3 through passage and pipe 91 to valve chamber 89, whence it will flow through passage 88 to timing reservoir 103 to charge same with fluid under pressure and through passage 67 to check valve chamber 87. At the same time fluid under pressure supplied to valve chamber 89 will also flow through passage 104 in slide valve 26 and passage 78 to piston chamber 77, where it will act on piston 74 in opposition to spring 82. When a sufficient pressure of fluid is thus obtained in chamber 77 to overcome spring 82, piston 74 will move upwardly, as viewed in the drawing, carrying dog 79 of plunger 76 out of locking relation with bosses 80 and 81 on control rod 17, followed by the unseating of valve 85 by the plunger 73 under the action of piston 74. Upon retraction of plunger 76 from the aforesaid locking relation and the unseating of check valve 85 fluid under pressure now present in volume reservoir 103, and reinforced by the continued supply of fluid under pressure from chamber 89 through passages 88 and 67, will flow through chamber 87, past check valve 85, through chamber 83 and passage 24 to chamber 23 and promptly cause piston 21 to deflect to the left, moving control rod 17 and integral pistons 18, 19 and 20 to the positions in which they are shown in the drawing, unless already so positioned.

Fluid under pressure supplied to passage 24 also flows through choke 27, passage and pipe 28 and port 29 to chamber 108 in the strut device 30. The pressure of fluid thus obtained in chamber 108 will move piston 107 upwardly until stopped by contact of piston rod 109 with the unsprung portion 106 of the vehicle. If the vehicle is empty, this movement of piston 107 will be so limited as not to open chamber 108 to pipe 52 by way of port 53, and said pipe and thereby chamber 51 will not be supplied with fluid under pressure so that control rod 17 will remain in the position in which it is shown in the drawing under the influence of pressure of fluid in chamber 23 acting on piston 21.

If the vehicle is carrying a half-load, for example, the strut device 30 will be so disposed relative to the unsprung portion 106 of the vehicle as to permit the piston 107 acting under the pressure of fluid in chamber 108 to move upwardly past the port 53 before the piston rod 109 contacts the unsprung portion 106 of the vehicle. Fluid under pressure will then flow from chamber 108 through port 53 to pipe 52 and thence to piston chamber 51 to act on piston 50 in the load adjustable control device 13 in the direction of the right hand. It will be noted that the area of piston 50 is larger than that of the opposing piston 21 so that when the pressure of fluid in chamber 51 increases sufficiently to provide a force on piston 50 which exceeds the opposing force created by pressure of fluid in chamber 23 acting on piston 21, the prevailing piston 50 will actuate rod 17 and the attached pistons to a position defined by contact of the piston 50 with a shoulder 113 formed in the casing and extending into chamber 47.

If the vehicle is carrying a full load, strut device 30 will be so disposed relative to the unsprung portion 106 of the vehicle that fluid under pressure provided in chamber 108 will move the piston 107 past both ports 53 and 49 before piston rod 109 contacts the unsprung portion 106. Fluid under pressure will then flow from chamber 108 through port 49 to pipe and passage 48, whence it will flow to piston chamber 47 while at the same time fluid under pressure in chamber 108 will also flow through port 53 to passage 52 and thence to chamber 51 in the load adjusting control device 13. Piston 46 will be therefore moved to its extreme right-hand position by pressure of fluid in chamber 47 against the spring 56, which position is defined by contact of piston 46 with a shoulder 114 formed in chamber 44 in the casing.

While rod 17 is being adjusted to a position corresponding to the loaded condition of the vehicle, as above described, the pressure of fluid in brake pipe 1 and in valve chamber 89 will flow through passage 104 in slide valve 26 and passage 78 to diaphragm chamber 96 to increase the pressure of fluid therein. This increase in pressure of fluid in chamber 96 acting on diaphragm 95 will gradually deflect said diaphragm against spring 94, thereby increasing the pressure of said spring opposing movement of diaphragm 93 from the position in which it is shown in order that diaphragm 93 and the slide valve 26 will not be moved by increasing pressure of fluid in brake pipe 1 and valve chamber 89 until after the control rod 17 has been properly adjusted as above described. Finally, at a chosen pressure in brake pipe 1 and valve chamber 89, such as fifty p. s. i., deflection of diaphragm 95 will be stopped by engagement of follower 99 with the annular lip 100 formed in the casing. As the pressure in brake pipe 1 and valve chamber 89 then continues to increase, such pressure will deflect diaphragm 93 against spring 94 and finally move slide valve 26 to a cut-off position defined by contact between a follower 115 for diaphragm 93 and the aforesaid annular lip 100.

In this cut-off position of slide valve 26 passage 78 and thereby piston chamber 77 will be connected to atmosphere by way of a chamber 116 at the upper side of slide valve 26 and an atmospheric passage 117. This venting of piston chamber 77 will permit spring 82, acting on the opposite side of piston 74, to move said piston and thereby the dog 79 downwardly into locking relation with one or both of the bosses 80 and 81 on the control rod 17 according to the load condition of the vehicle. Venting of passage 78 will also vent chamber 96 to atmosphere, thereby permitting spring 94 to return diaphragm 95 to the position in which it is shown in the drawing. This movement of diaphragm 95 will reduce the power of spring 94 urging diaphragm 93 in an upward direction so as to prevent movement of slide valve 26 out of its cut-off position until brake pipe pressure is subsequently reduced to some relatively low pressure such as ten p. s. i.

At the same time a cavity 118 in slide valve 26 will connect passage 88 leading from the timing reservoir 103 to passage 24 which leads to chamber 23 in the load adjustable control device 13 and to chamber 108 in the strut device 30 which, as previously noted, may be connected to piston chamber 51 on a half-loaded vehicle or to piston chamber 47 on a fully-loaded vehicle, as the case may be. Chamber 87 in the locking device 14 which is connected to timing reservoir 103 by way of passage 67 will likewise be vented to atmosphere. It will thus be seen that delaying the venting of the various piston chambers controlling the positioning of control rod 17 by the choke 120 will insure the operation of plunger 76 and dog 79 into locking relation with rod 17 while said rod is yet positively held in its load adjusted position by pressure of fluid.

It will now be seen that in charging the brake pipe 1 with fluid under pressure the brake control rod 17 will be adjusted to either one of its three different positions under the control of the strut device 30 according to whether the vehicle is empty, fully-loaded, or partially loaded as determined by the positioning of the strut device 30 carried by the sprung portion 105 relative to the unsprung portion 106 and will then be locked by plunger 76 in the adjusted position until the brake pipe 1 is subsequently recharged following depletion thereof to below the relatively low pressure of ten p. s. i. When the rod 17 is in its empty position as shown in the drawing, dog 79 will be disposed to the right of boss 81, when the rod is in its partially loaded position the dog 79 will be disposed between the bosses 80 and 81, and, when the rod is in its fully-loaded position, the dog 79 will be at the left-hand side of boss 80.

It should here be noted that at the same time as timing reserovir 103 is being charged with fluid under pressure supplied from brake pipe 1, fluid under pressure supplied to said passage 67 leading from said reservoir will also be permitted to flow past check valve 64 to chamber 65, and thence by way of passage and pipe 68 to the emergency reservoir 69 to accelerate the charging of said reservoir taking place by way of brake controlling valve device 3. Also, the auxiliary charging of the emergency reservoir 69 from charging passage 67 will take place at a point remote from any diaphragms or pistons, so that there will not be any low pressure area which might influence the operation of the device 6 adversely. When fluid under pressure is dissipated from reservoir 103 and passage 67 as previously described, check valve 64 will prevent backflow of fluid under pressure from emergency reservoir 69 to atmospheric passage 117.

Thus a car which previously has been set out of a train and has had its brake equipment depleted to atmospheric pressure, may have its largest storage volume, the emergency reservoir, quickly charged by way of the supplementary charging passage 67 and check valve 64 under the control of the cut-off valve device 15 until a brake pipe pressure of approximately 45 pounds is attained, at which time said valve device will cut off the connection between brake pipe 1 and charging passage 67. After this car has been added to a train and the emergency reservoir thereof has been charged in a normal manner, its operating pressures during normal operation thereafter will be higher than that of passage 67 and consequently check valve 64 will remain seated. It will be readily apparent, therefore, that a car equipped with this supplementary emergency reservoir charging means may be put into normal train operation much more quickly than by the usual means heretofore employed.

*Operation*

In operation, when a service or emergency reduction in brake pipe pressure is effected, the braking controlling valve device 3 will operate in the usual manner to supply fluid under pressure to brake cylinder pipe 4, whence it will flow to the main pressure chamber 9 in the brake cylinder device 7 and through passage 5 to the load adjustable control device 13. When the rod 17 in device 13 is adjusted for braking an empty vehicle, fluid under pressure thus supplied to passage 5 will flow to chamber 33 in device 13, whence it will flow through passage and pipe 34 to compensating chamber 12 in brake cylinder device 7. It will thus be seen that for an empty vehicle the braking power for any degree of brake application will be limited, with the respect to the loaded or partially loaded vehicle, by an equal fluid pressure acting on the area of piston 8 surrounding the cylinder 11 in opposition to the brake applying force created by the fluid under pressure in main pressure chamber 9.

When the rod 17 is positioned for braking a fully loaded vehicle in which, as previously noted, the boss 80 will be disposed at the right-hand side of dog 79, passage 34 will be cut off from passage 5 and connected by way of chamber 33 to atmospheric passage 32. In this position of control rod 17 the load compensating chamber 12 of the brake cylinder device 7 will therefore be vented to atmosphere by way of passage 32. With the load compensating chamber 12 vented to atmosphere, the degree of braking of the loaded vehicle will be governed solely by the pressure of fluid acting in chamber 9 on piston 8.

When the rod 17 is positioned for braking a partially loaded vehicle, the dog 79 will be interposed between the bosses 80 and 81, in which position chamber 121 located between pistons 18 and 19 will connect passage 5 to passage 39. Upon operation of brake controlling valve device 3 in effecting a brake application to supply fluid under pressure to main pressure chamber 9 by way of pipe 4, fluid under pressure supplied thereby to passage 5 will now flow through passage 39, chamber 40, passage 42 to the under side of check valve 41. When the pressure of fluid in passage 42 becomes sufficient to overcome the opposing force of spring 63, fluid under pressure supplied to passage 42 will flow through chamber 37 and passage 35 to chamber 33, whence it will flow through passage and pipe 34 to load compensating chamber 12 in the brake cylinder device 7.

It will thus be seen that the difference by which the pressure in main pressure chamber 9 exceeds that in compensating chamber 12 will be determined by the value of the spring 63. Thus, in applying the brakes on a partially loaded vehicle the application will be modified by the supply of fluid at a chosen lower pressure to the compensating chamber 12, thereby providing a proper degree of braking for such a vehicle.

In effecting a release of the brakes the brake controlling valve device 3 will connect the brake cylinder pipe 4 to atmosphere, thereby reducing the pressure in connected main pressure chamber 9 and in chamber 121 of control device 13 to atmosphere through connecting passage 5 when said device is conditioned for braking a partially loaded vehicle. Upon a reduction in pressure in chamber 121 to atmosphere fluid under pressure in chamber 12 will flow thereto through passage and pipe 34, chamber 33, passage 35, past check valve 36 to chamber 40, and thence through passage 39 to atmosphere as just described.

By reason of the relatively large seated area of check valve 36 substantially all of the fluid under pressure bottled in compensating chamber 12 by check valve 41 will be released to atmosphere past check valve 36 to insure movement of piston 8 to brake release position, so much so that a partial vacuum might be created in compensating chamber 12 upon movement of piston 8 toward release position under the action of return spring 10 and thereby prevent a complete release of the brakes on the vehicle. To alleviate this situation fluid may be drawn from the atmosphere into chamber 12 by way of passage 72, past check valve 70 to chamber 38 and thence through passage 35, chamber 33 and passage 34 to compensate for the displacement of piston 8 in its movement to release position.

With the control device 13 conditioned for braking an empty vehicle, as shown in the drawing, chamber 12 will be connected to passage 34, chamber 33, and passage 5 to brake cylinder pipe 4 and consequently will be released in unison with chamber 9.

With control device 13 conditioned for braking a loaded vehicle chamber 12 will be inactive by reason of a breather connection to atmosphere by way of passage 34, chamber 33, and atmospheric vent passage 32.

*Summary*

From the foregoing it will now be seen that I have provided a simple brake apparatus for railway vehicles comprising mainly a load compensating control device for cooperation with the usual AB equipment and the opposing pressure type of brake cylinder device, which control device is adjustable upon charging the usual brake pipe with fluid under pressure to provide upon subsequently effecting an application of brakes, either one of three different degrees of braking force for a vehicle corresponding to an empty vehicle, a fully loaded vehicle and a partially loaded vehicle. This device provides novel fluid intake means for permitting the release spring to return the brake cylinder piston to its fully released position. It also provides protection against excessive loss of air in the event of a broken connection to the strut device, and improved means for accelerating the charging of the emergency reservoir during initial charging.

Having now described my invention, what I claim as new and desire to secure by Letters Patent, is:

1. In a variable load brake apparatus for a vehicle having sprung and unsprung parts, in combination, a brake cylinder device comprising a casing having a piston therein dividing said casing into a main pressure chamber at one side of said piston and a compensating chamber at the opposite side and operative to provide a braking force on said vehicle equal to the difference in the effect of fluid pressure in said chambers on said piston and having a return spring urging said piston toward its release position, a brake pipe, a supply reservoir, brake controlling means operative in response to a reduction in brake pipe pressure to supply fluid under pressure from said reservoir to said main pressure chamber and in response to an increase in brake pipe pressure to release fluid under pressure from said main pressure chamber, control valve means having one position in which said compensating chamber is connected directly to said main pressure chamber, a second position in which said compensating chamber is cut off from said main pressure chamber and open to atmosphere, one check valve means permitting fluid in excess of a certain degree of pressure to flow to said compensating chamber, a second check valve means operative in response to a relatively low fluid pressure differential to permit fluid under pressure to flow from said compensating chamber to said brake controlling means, a third check valve means operative after fluid under pressure in said compensating chamber has been exhausted to said brake controlling means during a brake release operation to supply fluid under pressure from the atmosphere to said compensating chamber as said piston is moved to its release position by said return spring, said control valve means having a third position in which said one and said second check valve means are connected between said chambers and said third check valve means is connected to said compensating chamber, a brake control element movable to three different positions corresponding to the three respective positions of said control valve means, first, second and third movable abutments selectively operable by fluid under pressure to move said element to one, another or the third of said positions of said control element, respectively, latch means for locking said element in any one of said positions of said control element and operable by fluid under pressure to release said element for movement, a timing reservoir, valve means operable during charging of said brake pipe to a chosen pressure to supply fluid under pressure to said latch means, to said timing reservoir and to said first abutment and operable upon an increase in brake pipe pressure above said chosen degree to cut off the last said supply of fluid under pressure, strut device means carried by one of said vehicle parts operable by fluid under pressure supplied from said control valve means into cooperative relation with the other part for supplying fluid under pressure to either one or the other of the other two abutments according to the degree of vehicle load, and flow restricting means interposed between said control valve means and said strut device means for preventing rapid loss of fluid under pressure from said control valve means during excessive leakage of fluid under pressure from said strut device means and thereby insuring the operation of said control valve means responsively to increase in brake pipe pressure above said chosen degree.

2. In a variable load brake apparatus for a vehicle, in combination, a brake cylinder device comprising a casing having a piston therein dividing said casing into a main pressure chamber at one side of said piston and a compensating chamber at the opposite side and operative to provide a braking force on said vehicle equal to the difference in effect of fluid pressure in said chambers on said piston and having a return spring urging said piston toward its release position, brake controlling means operative to supply fluid under pressure to and release fluid under pressure from said main pressure chamber, control valve means having one position in which said compensating chamber is connected directly to said main pressure chamber and brake controlling means and another position in which said compensating chamber is cut off from said main pressure chamber and opened to atmosphere, one check valve means operative to permit flow of fluid under pressure from said brake controlling means to said compensating chamber when the first mentioned fluid is above a certain degree of pressure, another check valve means permitting flow of fluid under pressure only in a direction from said compensating chamber towards said brake controlling means, and a third check valve means permitting flow of fluid under pressure only in a direction from atmosphere towards said compensating chamber after said compensating chamber has been exhausted of fluid under pressure by operation of said brake controlling means and during the return of said piston to its release position under the action of said return spring, said control valve means also having an intermediate position in which said main pressure chamber is connected to the inlet side of said one check valve means and the outlet side of said other check valve means and said compensating chamber is connected to the outlet sides of said one check valve means and of said third check valve means and to the inlet side of said other check valve means.

3. In a variable load brake apparatus for a vehicle, in combination, a brake cylinder device comprising a casing having a piston therein dividing said casing into a main pressure chamber at one side of said piston and a compensating chamber at the opposite side and operative to provide a braking force on said vehicle equal to the difference in effect of fluid pressure in said chambers on said piston and having a return spring urging said piston toward its release position, brake controlling means operative to supply fluid under pressure to and release fluid under pressure from said main pressure chamber, control valve means having one position in which said compensating chamber is connected directly to said main pressure chamber and said brake controlling means, a second position in which said compensating chamber is cut off from said main pressure chamber and opened to atmosphere, one check valve means permitting fluid in excess of a certain degree of pressure to flow to said brake controlling means, a second check valve means operative in response to a relatively low fluid pressure differential to permit fluid under pressure to flow from said compensating chamber to said brake controlling means, and a third check valve means operative after fluid under pressure in said compensating chamber has been exhausted to atmosphere during a brake release operation to supply fluid under pressure from the atmosphere to said compensating chamber as said piston is moved to its release position by said return spring, said control valve means having a third position in which said one and second check valve means are connected between said chambers and said third check valve means is connected to said compensating chamber.

4. In a brake apparatus for a vehicle having sprung and unsprung parts, in combination, a brake control element movable to three different positions corresponding to three respective degrees of a vehicle braking, first, second, and third movable abutments selectively operable by fluid under pressure to move said elements to one, another or the third of said positions, respectively, a brake pipe, strut device means carried by one of said vehicle parts operable by fluid under pressure into cooperative relation with the other part for supplying fluid under pressure to one of said second or third movable abutments according to the vehicle load, valve means operable during charging of said brake pipe to a chosen degree to supply fluid under pressure to said first abutment and to said strut device means and operable upon an increase in brake pipe pressure above said chosen degree to cut off the last mentioned supply of fluid under pressure, and choke means interposed between said valve means and said strut device means to restrict the flow of fluid to said strut device means to a slower rate than the rate of supply to said choke, whereby the eventual operation of said valve means upon increase of brake pipe pressure above said chosen degree during normal charging of said brake pipe is assured.

References Cited in the file of this patent

UNITED STATES PATENTS

| | | |
|---|---|---|
| 831,040 | Custer | Sept. 18, 1906 |
| 2,364,927 | Sudduth | Dec. 12, 1944 |
| 2,390,049 | Baldwin | Dec. 4, 1945 |
| 2,425,591 | Birch | Aug. 12, 1947 |
| 2,482,246 | Cook et al. | Sept. 20, 1949 |